(No Model.) 2 Sheets—Sheet 2.
F. L. COLLIS.
CORN HUSKER AND FEED CUTTER.
No. 406,090. Patented July 2, 1889.
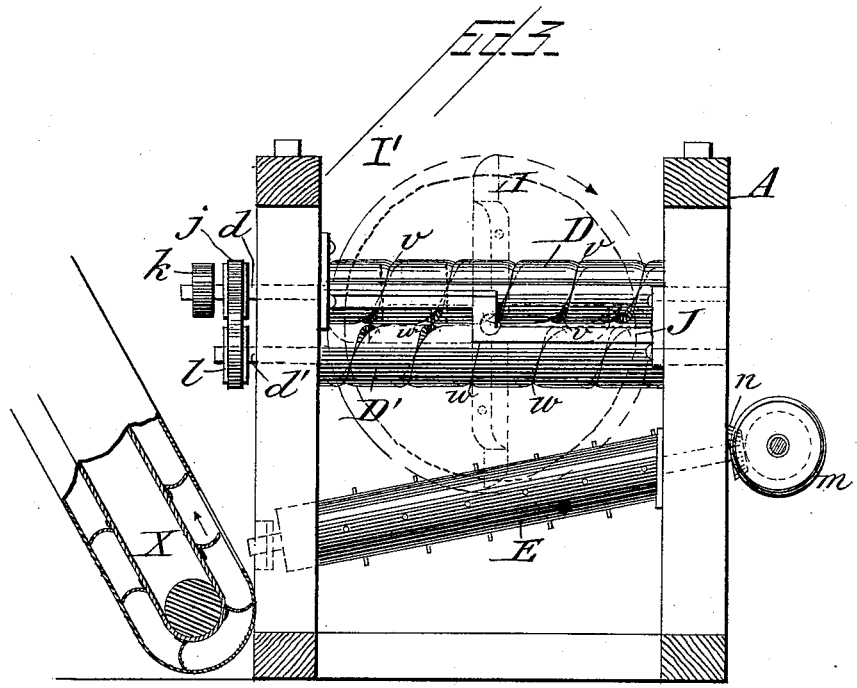
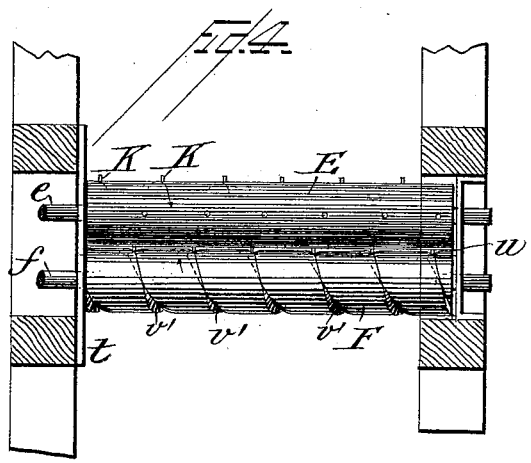

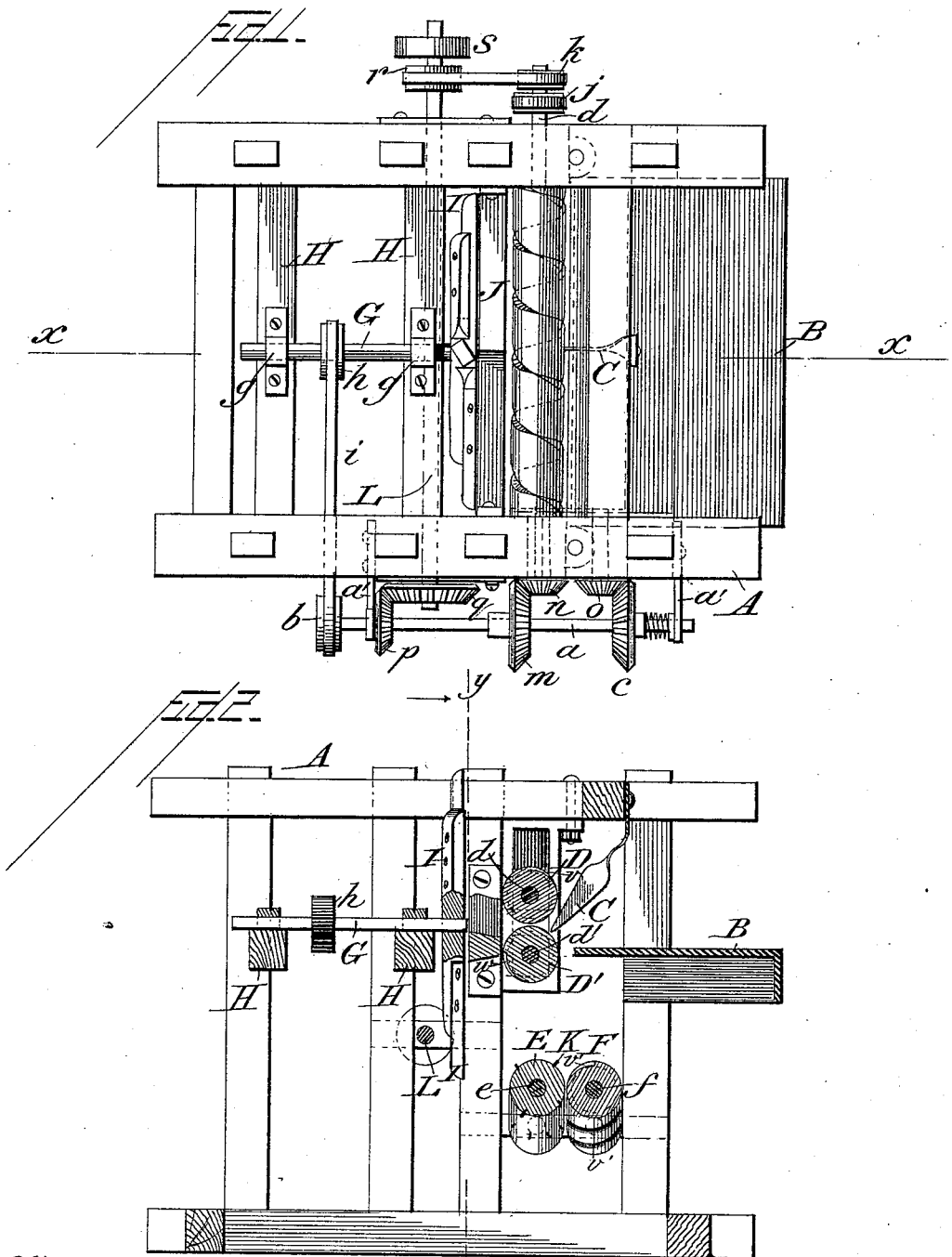

UNITED STATES PATENT OFFICE.

FRED LEE COLLIS, OF FREEDOM, ILLINOIS.

CORN-HUSKER AND FEED-CUTTER.

SPECIFICATION forming part of Letters Patent No. 406,090, dated July 2, 1889.

Application filed June 30, 1888. Serial No. 278,696. (No model.)

*To all whom it may concern:*

Be it known that I, FRED LEE COLLIS, a citizen of the United States, residing at Freedom, in the county of La Salle and State of Illinois, have invented certain new and useful Improvements in Combined Corn-Huskers and Feed-Cutters; and I do hereby declare the following to be a full, clear, and exact description of the invention, such as will enable others skilled in the art to which it appertains to make and use the same.

My invention has reference to a combined corn-husker and feed-cutting machine; and it consists in the construction, arrangement, and combination of parts, substantially as will be hereinafter described and claimed.

In the accompanying drawings, illustrating my invention, Figure 1 is a top plan view of my improved corn-husking and feed-cutting machine. Fig. 2 is a longitudinal vertical section on the line $x$ $x$ of Fig. 1. Fig. 3 is a vertical transverse sectional elevation on the line $y$ $y$ of Fig. 2, looking through the rear of the machine. Fig. 4 is a detail plan view of the lower rollers which convey the ears of corn to the elevator.

Similar letters of reference designate corresponding parts throughout all the different figures.

A denotes the frame of the machine, constructed in any convenient and suitable manner to permit the arrangement therein and therewith of the several mechanical parts which combine to constitute my machine. In the front portion of this frame is secured a horizontal feed-table B, upon which the corn is placed and fed forward thence into the machine and between the horizontal rollers D D', which may be termed the "husking-rollers," for they detach the ears of corn from the stalks, the latter being drawn through the rollers and presented thereby to cutting devices, which cut them up into fodder. Directly in front of the rollers D D', and above the feed-table, is a depending knife C, located centrally of the machine and adapted to cut up any stalks which might pass from the table to the rollers sidewise, and thus prevent a clogging of the machinery, which might take place at the cutter-bar if the stalks were permitted to pass sidewise through the rollers.

The rollers D and D' are carried, respectively, upon their shafts $d$ and $d'$, which are journaled in yielding bearings, as shown, to allow said rollers to have more or less play during the passage between them of the stalks and other substances with which the machine is to deal. Said rollers D and D' are furnished with spiral grooves, which on one side of the rollers are at right angles to the axes of the rollers, the groove upon the roller D being lettered $v$ and the groove upon the roller D' being lettered $w$. These grooved rollers constitute one of the main features of my present improvement. As the grooves run in opposite directions, their operation during the revolution of the rollers is to twist the ear from the stalk, and such twisting is accomplished much more readily, easily, and effectually when the rollers are spirally grooved in the manner indicated in the drawings than when they are made plain and smooth.

The shaft $d$ of roller D has a pulley $j$ thereupon and the shaft $d'$ of the roller D' has a pulley $l$, said pulleys $j$ and $l$ being connected by a belt, so that the two rollers D and D' may be simultaneously actuated. Upon the shaft $d$ there is also another pulley $k$, which connects by a belt, as shown in Fig. 1, with a pulley $r$ upon a horizontal shaft L, journaled in suitable bearings in the main frame of the machine and carrying a pulley $s$, to which power is applied for the purpose of driving the machinery of this present improvement in corn-husking and fodder-cutting devices.

Immediately behind the rollers D and D' is located a rotary device for cutting up the cornstalks into fodder, said device consisting of a radial series of knives I, secured upon a horizontal shaft G, journaled in boxes or bearings $g$ $g$, secured to the cross-beams H H of the main frame. The knives I are arranged to revolve in a vertical plane and are fixed with a circle of iron I' to strengthen them, and to operate as a balance-wheel. Between this cutting arrangement I and the rollers D D′ is a horizontal cross-piece J, secured at either end to the frame of the machine and adapted to act in conjunction with the cutting devices, so that the stalks may be cut between the knife and this cross-piece. Said cross-piece is rabbeted or made angular at its central point. Thus the knives cut on one side as they pass down by the said cross-piece and on the other side cut as they go up past it.

Upon the shaft G, which, it may be stated, extends in a direction at right angles to the direction of the rollers D D′, is a pulley $h$, which connects by a belt $i$ with a pulley $b$ on the end of the horizontal shaft $a$, journaled in projecting arms $a'$ $a'$, affixed to one side of the machine-frame. Said shaft $a$ carries the bevel-gear $p$, that meshes with a bevel-gear $q$ on the end of the shaft L, above mentioned, which shaft L, as we have already seen, is journaled in bearings in the main frame and extends across the machine. Thus it will be observed that the rotation of said shaft L will, through the intermediate gearing and shaftings just described, serve to rotate the cutters I. On the horizontal shaft $a$ are also located two bevel-gears $m$ and $c$. The gear $m$ meshes with a bevel-pinion $n$ on the end of the shaft $e$ of the lower roller E, and the gear $c$ meshes with the bevel-pinion $o$ on the end of the shaft $f$ of the lower roller F.

The two rollers E and F are located in an inclined position, as shown. They are located beneath the rollers D D′, and upon them the ears of corn fall after the husks have been removed therefrom by the grasping and twisting action of the rollers D and D′. The rollers E and F therefore serve to convey the ears of corn to an elevator, as X. (Shown in Fig. 3.) The highest ends of the shafts $e f$ of the rollers E F are journaled in a horizontal cross-piece $t$, fixed in the frame, and the lower ends of said shafts are carried in bearings in a horizontal connection $u$. (See Fig. 4.)

The rollers E and F are somewhat different in their structure. The roller E is provided at regular intervals with teeth K K, and the roller F is spirally grooved with a groove $v'$. Therefore when the two rollers rotate, the teeth K will mesh into the groove $v'$. The spiral groove on roller F serves to carry the ear along toward the elevator and at the same time pick off the husks. The teeth on rollers E, which mesh with the spiral groove on the other roller, are intended to bring the husk into position to be caught by the roller.

The operation of the machine will be evident from the foregoing description of the construction and relation of the several mechanical parts without need of additional detail, for it has already been described how the stalks and ears will be fed from the feed-table to the husking-rollers D D′, which will take the corn from the stalk and partially strip off the husks. The stalks will then pass through the rollers D D′, and be presented to the cutting mechanism, which will reduce them to proper size for fodder. The ears of corn will fall from the rollers D D′ upon the rollers E and F, which will take off the husks and convey the ears to the elevator, which will carry them away from the machine.

Various modifications may properly be made in the exact arrangement of parts herein specified. I do not wish to be limited to any specific form of the several parts or any special arrangement thereof, but deem my invention broad enough to permit me to vary the details and the precise arrangement without departing from the essential ideas of the invention.

Having thus described my invention, what I claim as new, and desire to secure by Letters Patent, is—

1. In a combined corn-husker and feed-cutter, the combination of the husking-rollers having spiral grooves, the cutting devices consisting of the radial knives secured to the rotary horizontal shaft and moving in a vertical plane, and a rigid horizontal cross-piece located in proximity to said knives, all substantially as described.

2. In a combined corn-husker and feed-cutter, the combination, with the husking-rollers, of a depending knife located in front of the same and adapted to cut up any stalks that are presented sidewise to the rollers, substantially as described.

3. In a combined corn-husker and feed-cutter, the combination of the husking-rollers having spiral grooves thereon, the depending knife forward of the husking-rollers, and the fodder-cutting devices consisting of the radial knives I, secured to a rotary shaft, and the rigid cross-piece J, all substantially as described.

4. In a combined corn-husker and feed-cutter, the combination of the husking-rollers D D′, having spiral grooves, the cutting mechanism consisting of the radial knives secured to a horizontal shaft and the inclined pair of lower rollers E F, which convey the ears of corn to the elevator, one of said rollers having projecting teeth and the other being spirally grooved, all substantially as described.

5. In a combined corn-husker and feed-cutter, the combination of the main frame A, feed-table B, located in the front portion thereof, the depending knife C above the feed-table, the husking-rollers D and D′, having spiral grooves, the radially-arranged fodder-cutting knives I, secured to a rotary shaft, the horizontal cross-piece J, and the inclined lower rollers E F, for feeding the ears of corn to the elevator, substantially as described.

6. In a combined corn-husker and feed-cutter, the combination of the husking-rollers D D′, carried on shafts $d$ and $d'$, journaled in yielding bearings, the radially-arranged cutting-knives secured to a rotary shaft, the inclined lower rollers E F, for conveying the ears of corn to the elevator, and suitable connecting-gearing whereby all of
5 the parts just mentioned are simultaneously actuated, substantially as and for the purpose described.

In testimony whereof I affix my signature in presence of two witnesses.

FRED LEE COLLIS.

Witnesses:
 THOS. C. FULLERTON,
 EDGAR G. DYER.